United States Patent
Hafner (10) Patent No.: US 6,964,550 B2
(45) Date of Patent: Nov. 15, 2005

(54) CHAIN CONVEYOR IN THE FORM OF SCALES

(75) Inventor: Hans Wilhelm Hafner, Aichach-Walchshofen (DE)

(73) Assignee: Pfister GmbH, Augsburg (DE)

( * ) Notice: Subject to any disclaimer, the term of this patent is extended or adjusted under 35 U.S.C. 154(b) by 0 days.

(21) Appl. No.: 10/482,260

(22) PCT Filed: Jun. 25, 2002

(86) PCT No.: PCT/EP02/07018

§ 371 (c)(1),
(2), (4) Date: Jun. 28, 2004

(87) PCT Pub. No.: WO03/001161

PCT Pub. Date: Jan. 3, 2003

(65) Prior Publication Data

US 2004/0231964 A1    Nov. 25, 2004

(30) Foreign Application Priority Data

Jun. 25, 2001 (EP) .................................. 10130022

(51) Int. Cl.⁷ ........................ B65G 17/16; G01G 11/04
(52) U.S. Cl. ........................ 414/21; 198/817; 198/959; 177/119
(58) Field of Search ................ 414/21; 198/502.1, 198/959, 817, 844.1, 851, 845; 177/119, 177/145, 52

(56) References Cited

U.S. PATENT DOCUMENTS

| | | | | |
|---|---|---|---|---|
| 1,647,704 A | * | 11/1927 | Lea | 198/502.2 |
| 1,790,568 A | * | 1/1931 | Arnold | 198/550.13 |
| 1,953,388 A | * | 4/1934 | Bettin | 474/231 |
| 2,285,765 A | * | 6/1942 | Carswell | 366/18 |
| 2,635,867 A | * | 4/1953 | Fogwell et al. | 177/162 |
| 2,830,803 A | * | 4/1958 | Doyle | 177/16 |
| 2,954,113 A | * | 9/1960 | Hibbard et al. | 198/867.15 |
| 3,338,382 A | * | 8/1967 | Fogg | 198/794 |
| 3,679,010 A | * | 7/1972 | Bullivant | 177/16 |
| 3,884,313 A | * | 5/1975 | Engels | 177/119 |
| 3,944,050 A | * | 3/1976 | Kane | 198/497 |
| 3,955,637 A | * | 5/1976 | Del Rosso | 177/145 |
| 4,126,196 A | * | 11/1978 | Hyer et al. | 177/121 |
| 4,420,051 A | * | 12/1983 | Furuta et al. | 177/25.12 |
| 4,463,816 A | * | 8/1984 | MacFarlane | 177/119 |
| 4,741,431 A | * | 5/1988 | Whitehead | 198/844.1 |
| 5,285,019 A | * | 2/1994 | Kempf et al. | 177/16 |
| 5,294,756 A | * | 3/1994 | Lauber et al. | 117/119 |
| 5,576,520 A | * | 11/1996 | Waterman et al. | 177/145 |
| 5,813,195 A | * | 9/1998 | Nielsen et al. | 53/443 |
| 5,814,772 A | * | 9/1998 | Nishimura et al. | 177/145 |

(Continued)

FOREIGN PATENT DOCUMENTS

DE    42 30 368 A1    3/1994

(Continued)

Primary Examiner—Douglas Hess
(74) Attorney, Agent, or Firm—Knobbe, Martens, Olson & Bear LLP (57) ABSTRACT

A chain conveyor for gravimetrically measuring/dosing materials, especially bulk materials. The conveyor includes a housing/trough in which at least two chain conveyors with strip-shaped driving elements attached thereto rotate, wherein a measuring bridge that is supported on at least one force measuring device is arranged between the inlet and an outlet hole. The driving elements are mounted with multiple articulations on the conveyor chains, more particularly, said driving elements are inserted with positive-fit by lateral hinge bolts in the chain links located on the upper edge and configured to be placed flatly in the measuring bridge.

10 Claims, 4 Drawing Sheets

U.S. PATENT DOCUMENTS

| | | | |
|---|---|---|---|
| 5,873,452 A * | 2/1999 | Nolan | 198/465.3 |
| 5,927,924 A * | 7/1999 | Kemmer et al. | 414/21 |
| 6,084,184 A * | 7/2000 | Troisi | 177/145 |
| 6,273,665 B1 * | 8/2001 | Homer, III | 414/327 |
| 6,341,930 B1 * | 1/2002 | Homer, III | 414/327 |
| 6,437,255 B1 * | 8/2002 | Ludescher | 177/16 |
| 6,545,231 B1 * | 4/2003 | Häfner | 177/119 |
| 6,662,930 B2 * | 12/2003 | Yester | 198/502.1 |
| 6,683,261 B2 * | 1/2004 | Murata et al. | 177/25.18 |

FOREIGN PATENT DOCUMENTS

| | | |
|---|---|---|
| DE | 195 36 871 A1 | 4/1997 |
| DE | 196 40 713 A | 4/1997 |
| FR | 2 545 797 A | 11/1984 |
| WO | WO 00/00795 | 6/1999 |

* cited by examiner

CHAIN CONVEYOR IN THE FORM OF SCALES

RELATED APPLICATIONS

This application is the U.S. National Phase of PCT/EP02/07018 filed Jun. 25, 2002 and claims priority to German Patent Application No. 101 30 022.0 filed Jun. 25, 2001, which are hereby incorporated herein by reference in their entirety.

BACKGROUND OF THE INVENTION

1. Field of the Invention

The invention relates to a chain conveyor for gravimetrically measuring/dosing materials, especially bulk materials, with said conveyor comprising a housing/trough in which at least two conveyor chains with strip-shaped driving elements attached thereto rotate, as well as an inlet/filling opening and an outlet opening in the housing/trough, with at least one measuring bridge (2) which is supported on at least one force measuring apparatus is arranged between the inlet/filling and outlet opening.

2. Description of the Related Art

Such chain conveyors are used especially for conveying and weighing bulk materials. Such chain conveyors are also used increasingly in the basic industry (e.g. in the production of cement) for dosing or detecting the conveying strength of bulk materials because they allow a wear-resistant configuration at high throughputs and high draw-off forces. Moreover, the chain conveyor is relatively cheap to produce and service and easy to mount, so that the same is also suitable as a bunker draw-off member for abrasive, coarse or adhesive bulk materials due to this sturdy configuration.

The disadvantageous aspect in the conventional arrangement of the chain conveyor is that the dosing precision can be relatively low when the conveyed material sticks to the driving element webs during the emptying or when disturbing forces from the conveyor chains alter the measurement. This can lead to significant deviations concerning the dosing precision, which is important however for mixtures of additives. Weighing machines are already known in conjunction-with belt conveyors or even discharging plate conveyors (e.g. according to DE 195 36 871 or DE 42 30 368), with the conveyor belt or the discharging plate conveyor belt extending over a stationary weigh-bridge. These conveyors come with disadvantages relating to the wearing behavior or the required power consumption because conveyor belts made of rubber materials are subject to high wear and tear even in reinforced configuration on the one hand, whereas on the other hand discharging plate conveyor belts show high friction due to the relative movement between the individual joints, especially under high load.

SUMMARY OF THE INVENTION

The invention is therefore based on the object of improving the dosing precision of chain conveyors in combination with a simple design.

As a result of the multiple articulations of the "trailing" or dragging arranged driving elements, driving elements are "uncoupled" in respect of weighing from the conveyor chains. As a result of this at least double articulation of the driving elements on the conveyor chains, the driving elements rest flat on the sliding surfaces of the weigh-bridge. Moreover, disturbing forces on the conveyor chains (e.g. when grainy material is clamped between the driving elements and the weigh-bridge) are substantially avoided, so that the measuring section per se is free from external forces. As a result of this height-movable guidance of the driving elements (which are U-shaped in a top view) on the conveyor chains, a reliable and simple multiple uncoupling is obtained, with the driving elements being driven in a secure fashion by the conveyor chains in the rotating direction. In this way it is possible to securely avoid problems with uneven conveyance as can occur in the rigid arrangement of the driving elements.

An especially simple embodiment of the proposed chain conveyor is obtained in such a way that the driving elements of the chain conveyor are swivelably arranged on a guide-bar-like or bracket-like holding device. This arrangement is especially also suitable for retrofitting existing chain conveyors because the simple fastening of the lateral hinge bolts allow retrofitting the chain conveyor (and even chain trough conveyors) with the gravimetric force measuring apparatus.

The same applies for the movable mounting of the driving elements which are held in an uncoupled manner via further intermediate joints. By interposing such intermediate joints, especially simple hinges or chain links which are arranged in an upright fashion, a kind of "cardanic" mounting is obtained and thus an automatic centering of the driving elements as conveying tools. Moreover, when arranging lateral limits on the driving elements the conveyor chains run outside of the train of bulk material, so that wear and tear can be reduced substantially.

BRIEF DESCRIPTION OF THE DRAWINGS

A special advantage is the recirculation of material which can thus be achieved, so that abraded pieces of bulk material and so-called ejected grain can be returned to the inlet opening.

Further advantageous arrangements are shown in the description below of embodiments shown in the drawings, wherein.

DETAILED DESCRIPTION OF THE PREFERRED EMBODIMENT

Figure 1:
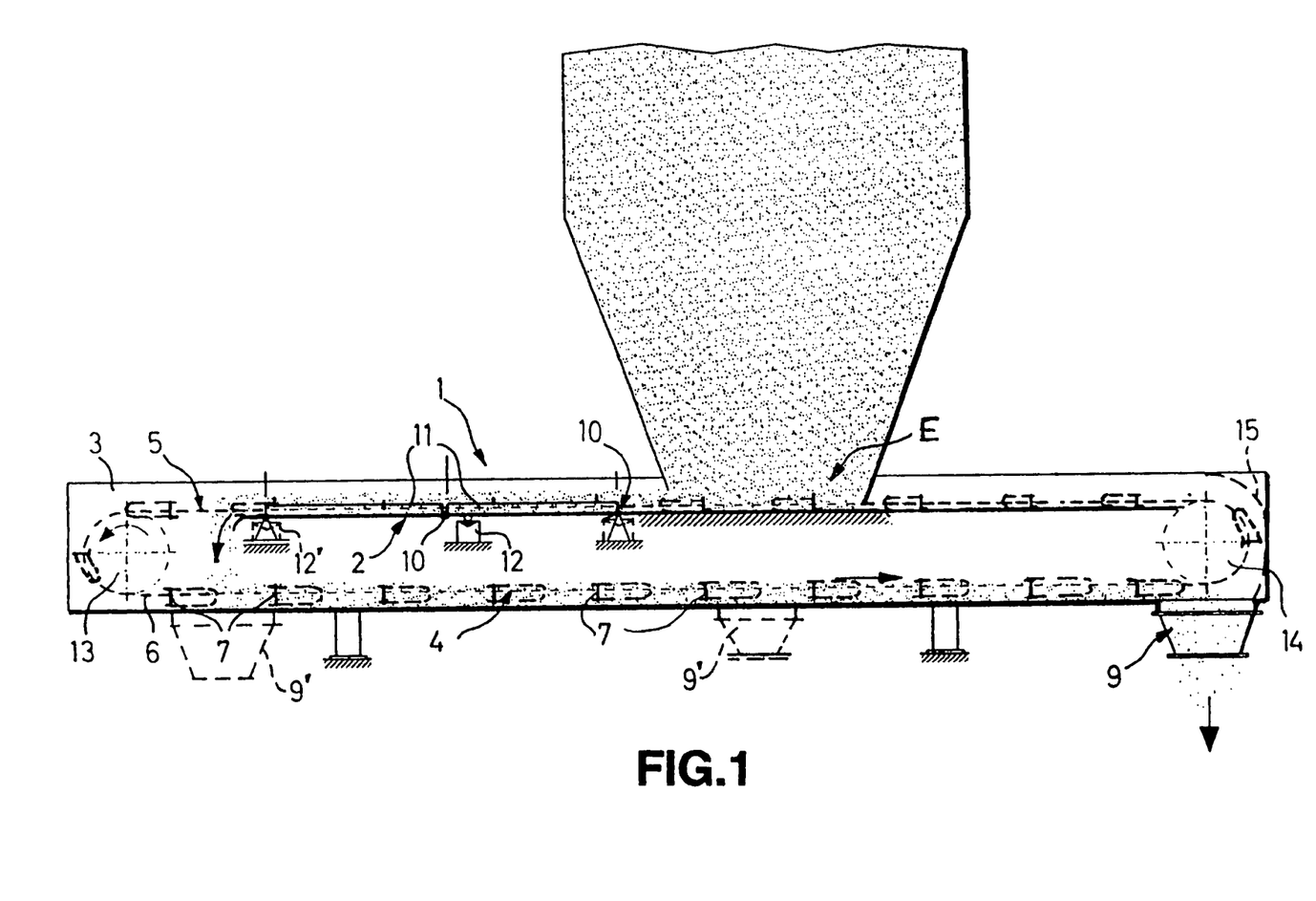
FIG. 1 shows a chain conveyor scale in a side view.
Figure 2:
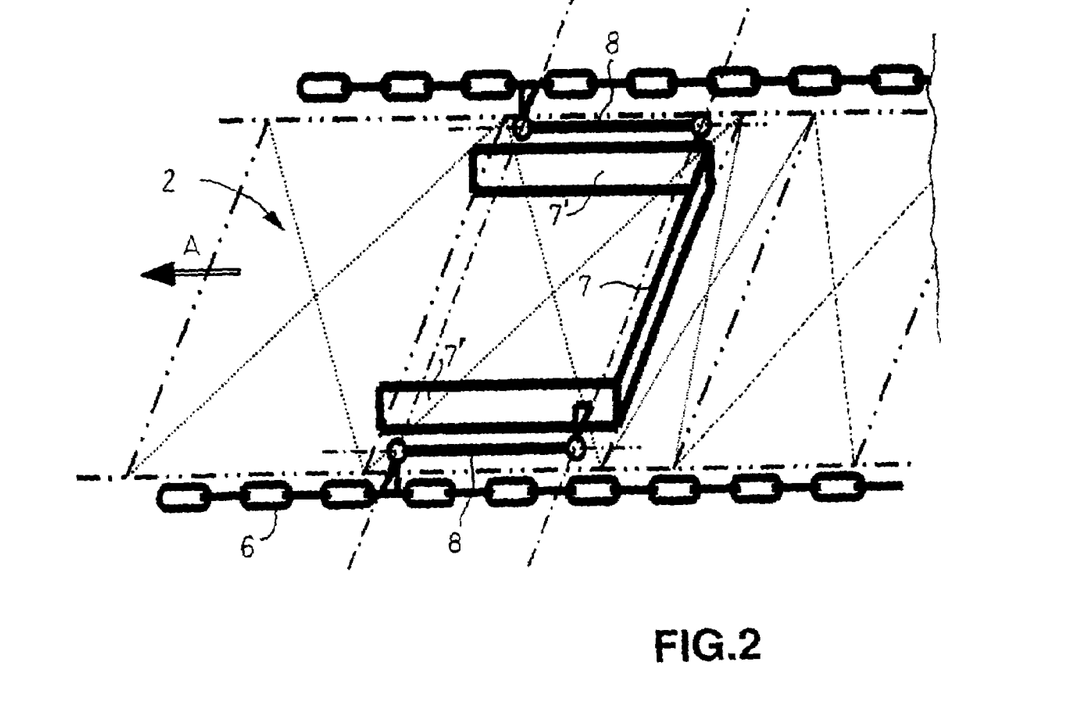
FIG. 2 shows a sectional view of the chain conveyor scale according to FIG. 1 in an enlarged perspective view.

FIGS. 1 and 2 show a side view and a perspective view of a chain conveyor 1 in a housing or trough 3 which comprises a straight measuring section or measuring bridge 2 which is arranged on the upper run 5 of the belt. Conveyor chains 6 run along the measuring bridge 2 in a housing/trough 3, which conveyor chains comprise U-shaped conveying tools (in the top view) or driving elements 7. As a result of these drag-link driving elements 7, the bulk material which enters the housing 3 through an opening E (which in this case is a bunker or silo) is conveyed along the measuring bridge 2 in the carrying run 5 of the belt and then along the lower run 4 in a clockwise manner to an outlet opening 9, as is indicated here with the arrows. Between the inlet/filling opening E and the outlet opening 9 the plate-like measuring bridge 2 is held in a movable or slightly resilient fashion by means of flexible intermediate elements and is supported in this respect on a force measuring apparatus 12 which is arranged at least below the measuring bridge and supports in particular an approximately centrally arranged weighing cell. A drive 13 is provided adjacent to the left end of the measuring bridge, which drive is provided in the form of a chain wheel which engages in the conveyor chains 6.

After the conveyance along the measuring section/measuring bridge 2, the conveyed bulk material (which is indicated with the dotted line) reaches a wear-proof base plate in the front discharge end before the drive 13 in the region of the lower run 4 and finally the outlet opening 9 under horizontal conveyance with the mutually parallel extending conveyor chains 6 and the bracket-like drive elements 7 where it can fall out under the influence of gravity or can also be blown out. Notice must be taken that such a blow-out line (not shown) can be arranged in the housing 3 (especially in the case of a pressure-tight or dust-proof arrangement of the chain conveyor). No disturbing moments are exerted on the force measuring apparatus 12. Moreover, it can be used to perform the cleaning of the conveyor chains 6 and/or the driving elements 7.

Figure 6:
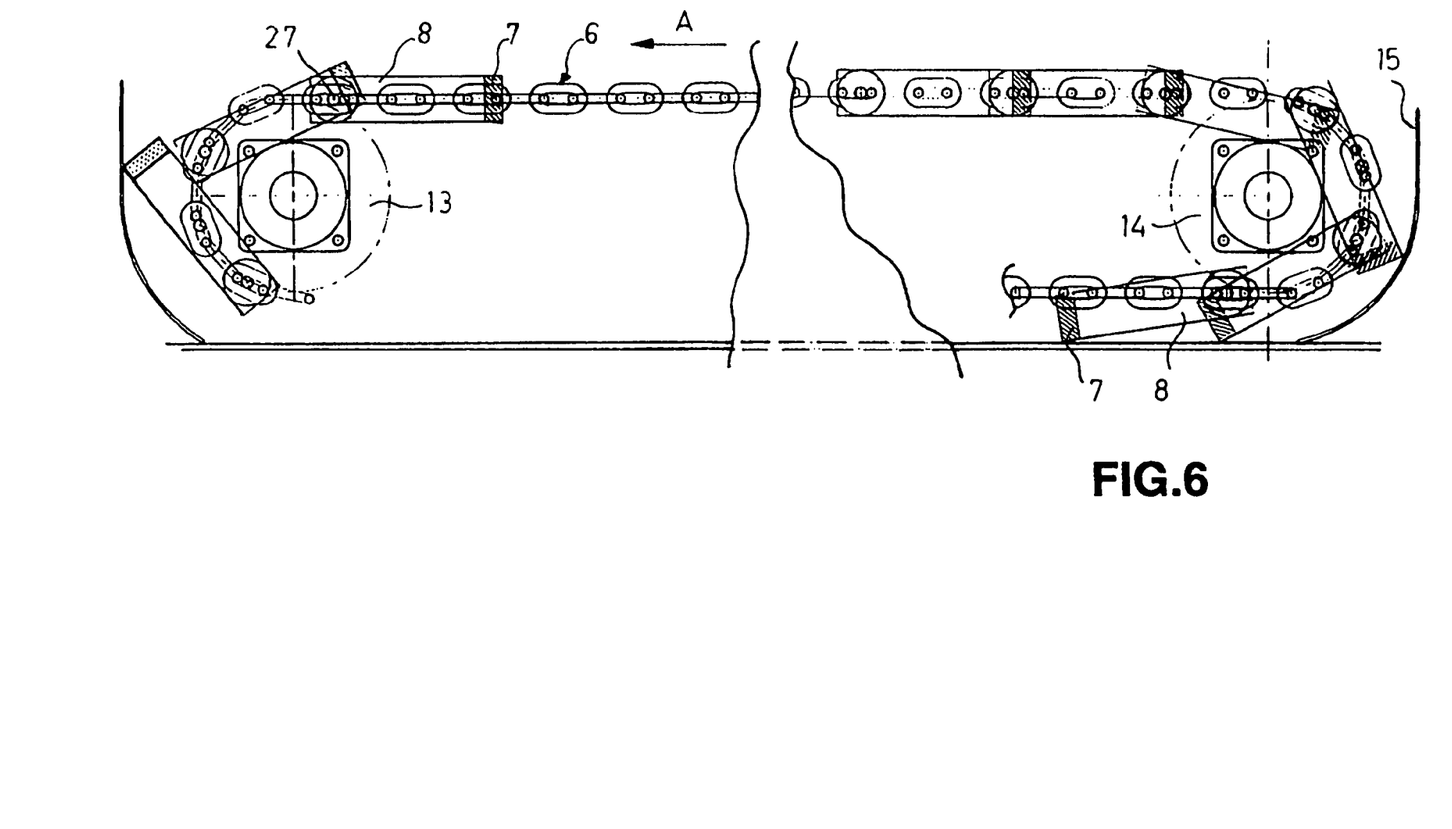
FIG. 6 shows a sectional view of the end zones of the chain conveyor in a side view.

Relevant is also the guidance along the housing bend 15 which is on the right in this case, because it can be used to upwardly recirculate any bulk material that may not have been ejected (cf. FIG. 6). Transverse force sensors or weighing cells on inductive, capacitative or piezoelectric basis can be used as force measuring apparatuses 12 for the measuring bridge. Preferably, a virtually pathless measuring force measuring apparatus 12 (especially a strain-gauge weighing cell) is used because this allows limiting the bend angle of the measuring bridge 2 to a few angular minutes, so that the circulatory movement of the conveyor chains 6 is practically not obstructed.

The force measuring apparatus 12 conducts the measured values on the conveyed weight of the bulk material to a computer which calculates the momentary flow rate by forming the product from the measured values together with the speed values which are obtained for example from a tachometer generator on drive 13. This actual value is compared for dosing purposes preferably with a predetermined setpoint value and in the case of deviations the controllable drive 13 is readjusted in the known manner.

Figure 3:
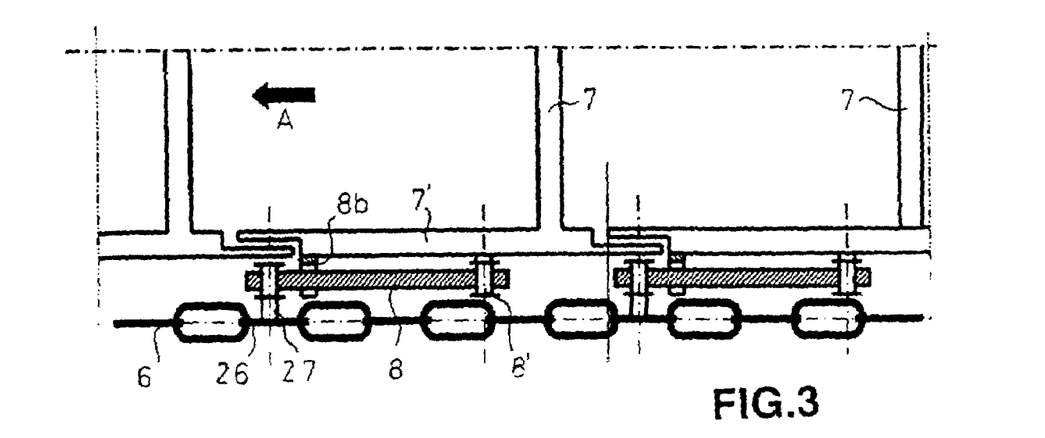
FIG. 3 shows a pertinent top view according to FIG. 2.

FIGS. 2 and 3 show the side region of the driving elements 7 which are held on guide-rod-like holding devices 8, with the "floating" plug-type connection of the hinge bolts 27 on one upright chain link each of the conveyor chain 6 being shown.

The relevant aspect is that the U-shaped driving elements 7 are height-movable or height-swivelable with respect to the conveyor chains 6 and the measuring bridge 2, so that occurring disturbing forces, if any, are not included in the result of the measurement or can be eliminated by the measuring bridge 2. The driving elements 7 can be additionally loaded by heavy-metal inserts or the like in order to achieve a defined bearing behavior. The conveyor chains 6 per se can be guided on both sides in guide elements 11 which are slotted in a cross-like manner, whereas the driving elements 7 are inserted with the hinge bolts 27 (see in particular FIGS. 3 to 5) into the upright chain links 26 on the side with loose fit, so that disturbing forces cannot be passed on to the conveyor chains and the driving elements 7 rest in a plane and uncoupled in several ways (i.e. insat least two degrees of freedom) on the measuring bridge 2 or on their halves in the case of a bent bridge.

It is possible to also omit the lateral guide function of the guide elements 11, so that the conveyor chain 6 can be hindered from lifting off from the measuring section in an upwardly manner for example by a smooth strip, whereas the lower side of the conveyor chains 6 can revolve on a PTFE strip on the measuring bridge 2. Rollers or wheels can also be provided for the purpose of guiding and supporting the conveyor chains 6 on the measuring section.

As is indicated in FIG. 1 by the broken line, the outlet opening 9' can also be arranged below the filling opening E or close to the drive 13. The outlet opening 9 can also be followed by a second measuring bridge. This allows detecting the weight of the driving elements, so that the actually occurring quantity of transported bulk material can be determined at the outlet opening 9 by differentiation following a comparison of the two measured values of the measuring bridges. If bulk material particles should adhere to the driving elements 7 or the conveyor chains 6, only the bulk material quantity is detected which effectively leaves the chain conveyor 1.

Figure 4:
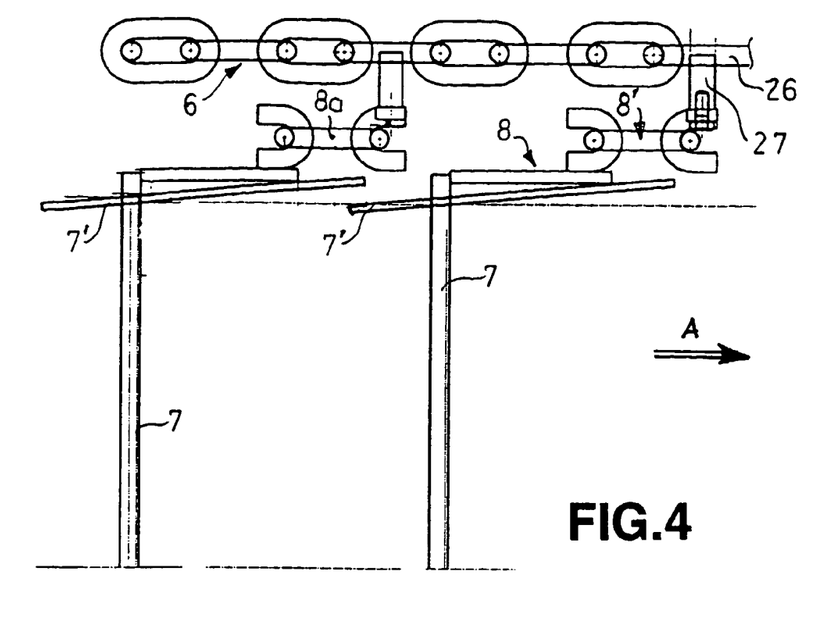
FIG. 4 shows a further representation of the side region of the chain conveyor as shown in FIG. 3.
Figure 5:
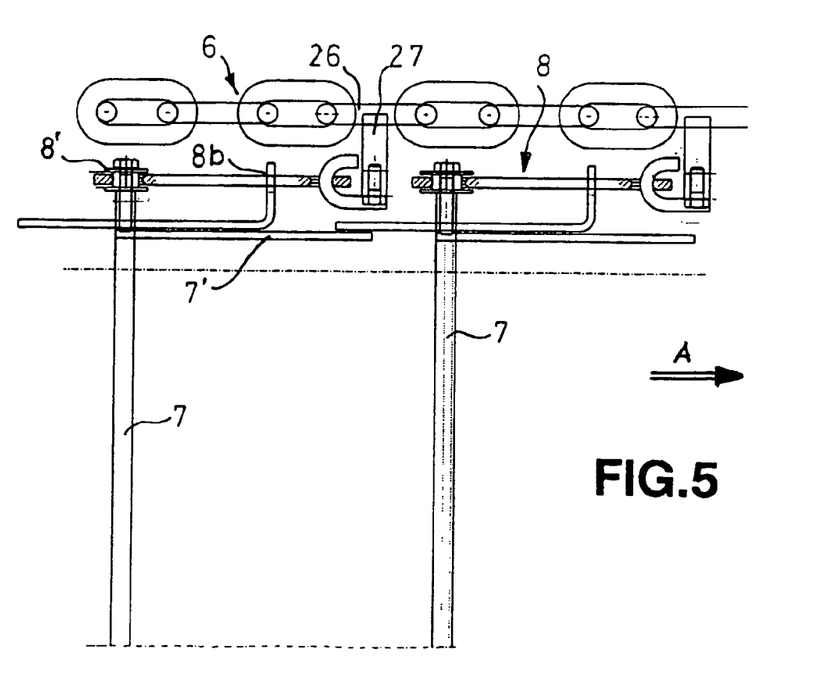
FIG. 5 shows a further modified arrangement of the holding device according to FIGS. 3 and 4.

As indicated above, the vertical movement play of the driving elements 7 is relatively small, as also the slight lateral mobility, so that the rotary movement of the conveyor chains 6 is not obstructed. Instead, the driving elements 7 are centered in the lateral direction. As is shown in FIGS. 4 and 5, drag-links 8' are provided on the holding devices 8 as swivelable bearings for the driving elements 7, which links also allow a certain lateral mobility of a few millimeters. In the most simple of configurations, the drag-link 8' is formed by an upright chain link fastened to the holding device 8 in the manner of a cardanic mounting (FIG. 4), with link bars of the parallelogram also being possible. In the arrangement according to FIG. 5 the swivelability of the driving elements 7 in the direction of height (perpendicular to the drawing plane) about the axis of the drag-link 8' is limited by a stop 8b which engages in an oblong hole of the holding device 8. Instead of this bracket/bolt mounting it is also possible to provide other low-friction bearings for forming the drag-link 8'. It can also be seen that the hinge bolts 27 are inserted here into every fourth chain link of the conveyor chains, with the distance between the hinge bolts 27 also being allowed to be more than four chain links, so that the lateral boundaries 7' can extend in the manner of a boundary plate in a mutually overlapping manner along the measuring bridge 2 in order to prevent any lateral discharge of the conveyed bulk material towards the conveyor chains 6.

FIG. 6 shows the two deflection regions of the chain conveyor 1. An excessive tilting of the driving elements 7 can be provided in the right region (drive wheel 13) during the transition from the upper run to the lower run by the said stops 8b. Excessive friction on the housing can thus be excluded. At the opposite end (deflection wheel 14), the limited swiveling movement of the driving elements 7 in combination with the housing bend 15 is used for the upward recirculation of material. A defined contact of the driving elements 7 on the housing bend 15 can also be achieved in this case.

Notice must be taken that the measured values of the force measuring apparatus(es) 12 are supplied to a known electronic evaluation system with a computer for calculating the momentary conveying strength compiled of measuring bridge load and conveying rate and are compared there with the defined set-point values. By accelerating or braking the drive 13 of the chain conveyor 1 (e.g. with electronic speed control) the desired conveying or dosing quantity (conveying strength or conveying capacity) can be adhered to precisely, even in the case of materials that are difficult to convey such as clinker or hot bulk materials. The chain conveyor in the form of scales can also be provided with a configuration that is completely dust-proof.

What is claimed is:

1. A chain conveyor for gravimetrically measuring/dosing materials, especially bulk materials, with said conveyor comprising a housing/trough in which at least two conveyor chains with strip-shaped driving elements attached thereto rotate, as well as an inlet/filling opening and an outlet opening in the housing/trough, with at least one measuring bridge which is supported on at least one force measuring apparatus arranged between the inlet/filling and outlet opening, characterized in that the driving elements are mounted with multiple articulations on the conveyor chains, and are inserted with lateral hinge bolts in a positive-fitting manner in upright chain links, and are configured to be placed flatly on the measuring bridge.

2. A chain conveyor as claimed in claim 1, characterized in that the driving elements are swivelably arranged on guide-bar-like-holding device.

3. A chain conveyor as claimed in claim 2, characterized in that the holding device comprises a drag-link, in the form of an upright chain link or link bars of a parallelogram.

4. A chain conveyor as claimed in claim 3, characterized in that the drag-link comprises at least one stop for delimiting a vertical stroke of the respective driving element.

5. A chain conveyor as claimed in claim 1, characterized in that the driving elements comprise lateral boundaries forming a U-shape in a top view.

6. A chain conveyor as claimed in claim 5, characterized in that the boundaries correspond in the conveying direction approximately to the lateral length of the measuring bridge or are provided with an arrangement which is longer than the measuring bridge.

7. A chain conveyor as claimed in claim 1, characterized in that the driving elements are arranged in a trailing manner along the conveyor chains by at least two chain links relative to the hinge bolts.

8. A chain conveyor as claimed in claim 1, characterized in that the driving elements each comprise a top weight.

9. A chain conveyor claimed in claim 1, characterized in that the hinge bolts engage with an at least low loose fit in the conveyor chains.

10. A chain conveyor as claimed in claim 1, characterized in that the driving elements are provided with a recirculating arrangement in a deflection region-from lower run to upper run.

* * * * *

UNITED STATES PATENT AND TRADEMARK OFFICE
CERTIFICATE OF CORRECTION

PATENT NO. : 6,964,550 B2
DATED : November 15, 2005
INVENTOR(S) : Hafner

It is certified that error appears in the above-identified patent and that said Letters Patent is hereby corrected as shown below:

Title Page
Item (56), Ref. cited. U.S. Pat. Doc., after "Lauber et al." delete "117/119" and insert -- 177/119 --

Item (57), line 10 of the Abstract, after "edge and" insert -- are --

Column 1
Line 27, delete "e.g." and insert -- e.g., --

Line 43, before "with" delete "-"

Line 44, delete "e.g." and insert -- e.g., --

Line 66, delete "e.g." and insert -- e.g., --

Column 2
Line 46, after "4" delete "," and insert -- ; --

Column 3
Line 62, delete "i.e." and insert -- i.e., --

Line 62, delete "insat" and isnrt -- in at --

Column 4
Line 61, delete "e.g." and insrt -- e.g., --

UNITED STATES PATENT AND TRADEMARK OFFICE
CERTIFICATE OF CORRECTION

PATENT NO. : 6,964,550 B2
DATED : November 15, 2005
INVENTOR(S) : Hafner

It is certified that error appears in the above-identified patent and that said Letters Patent is hereby corrected as shown below:

<u>Column 6</u>
Line 15, after "conveyor" insert -- as --

Line 16, after "with" delete "an"

Line 20, delete "region-from" and insert -- region from --

Signed and Sealed this

Eleventh Day of July, 2006

JON W. DUDAS
*Director of the United States Patent and Trademark Office*